H. A. DANIELS.
HAY STACKER.
APPLICATION FILED MAY 27, 1912.
1,071,511.
Patented Aug. 26, 1913.
4 SHEETS—SHEET 3.
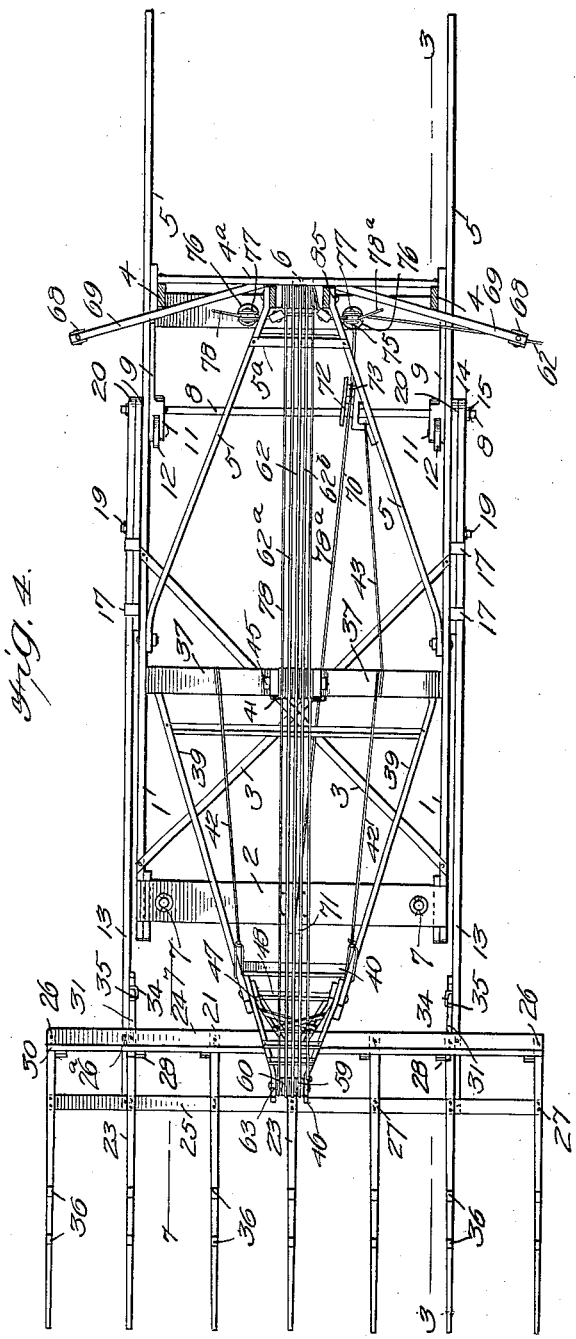
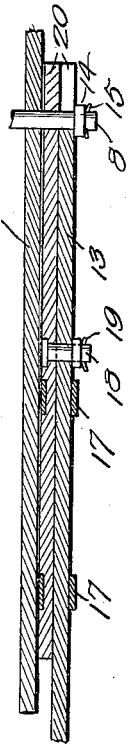
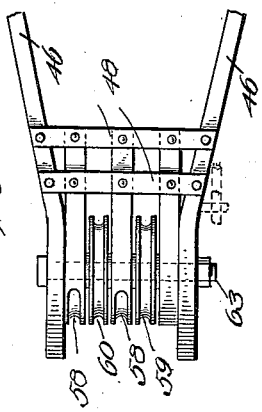
WITNESSES
INVENTOR
Herbert A. Daniels
BY
ATTORNEYS H. A. DANIELS.
HAY STACKER.
APPLICATION FILED MAY 27, 1912.
1,071,511.
Patented Aug. 26, 1913.
4 SHEETS—SHEET 4.
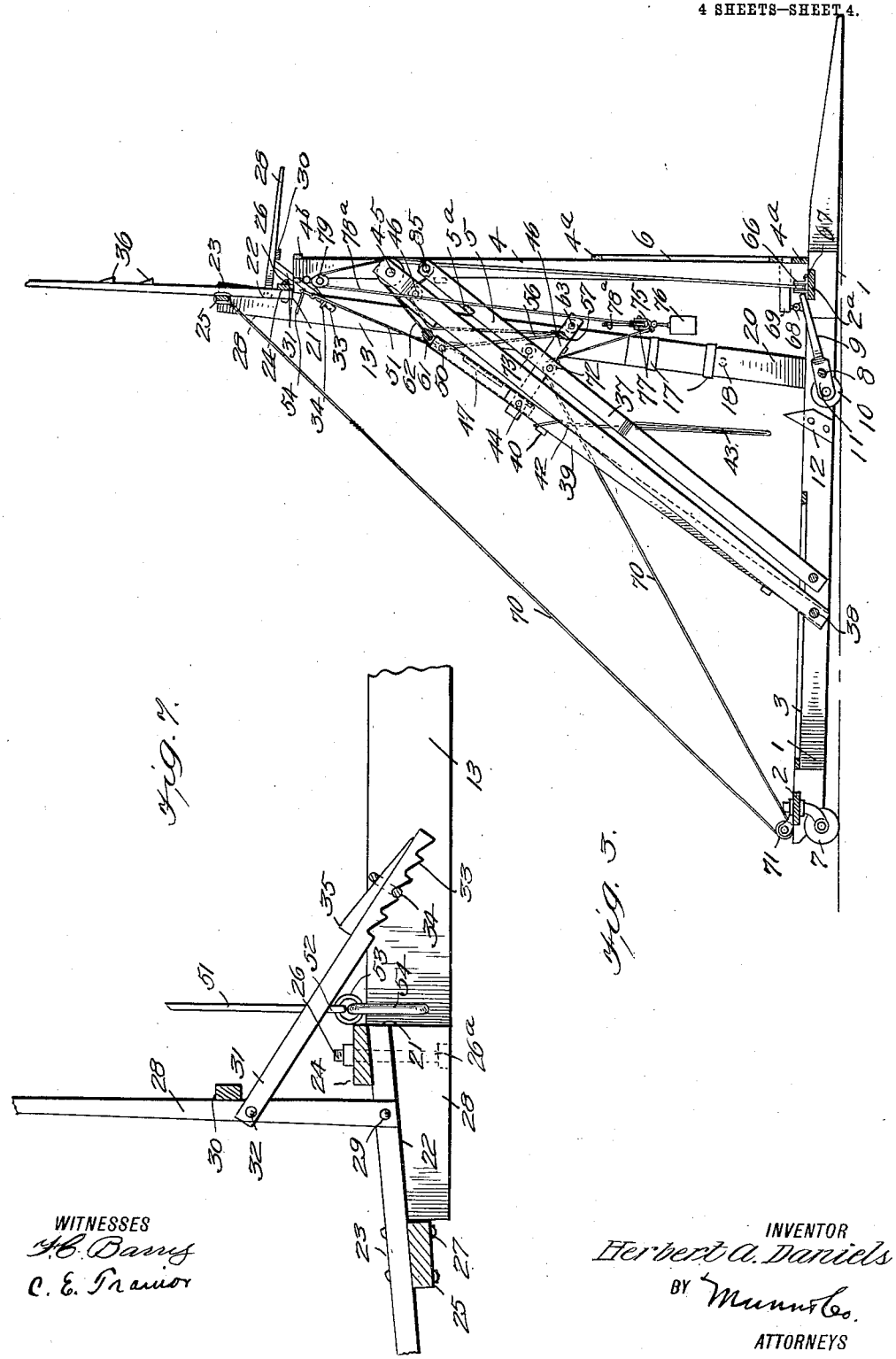
WITNESSES
INVENTOR
Herbert A. Daniels
BY Munn & Co.
ATTORNEYS

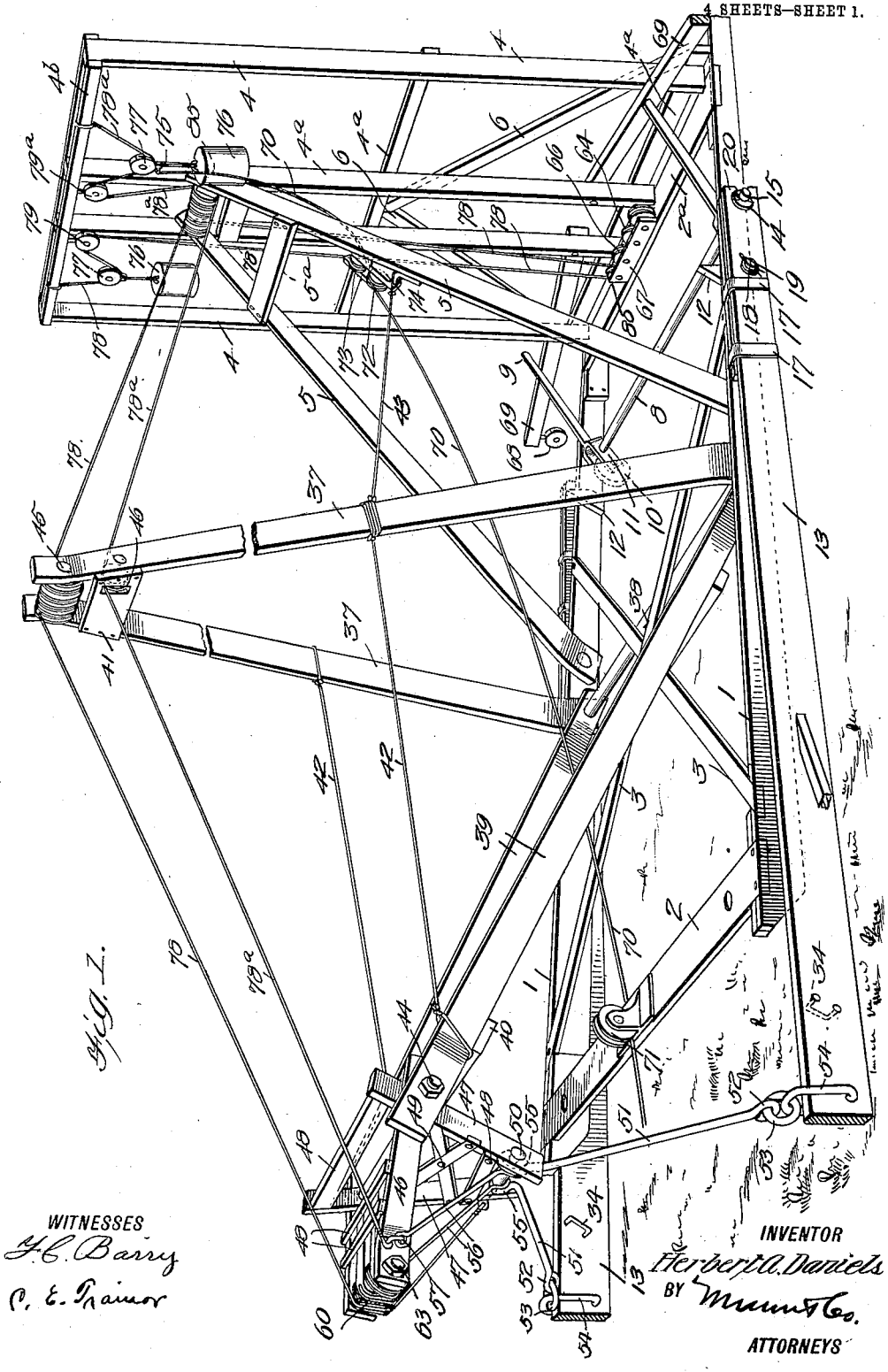

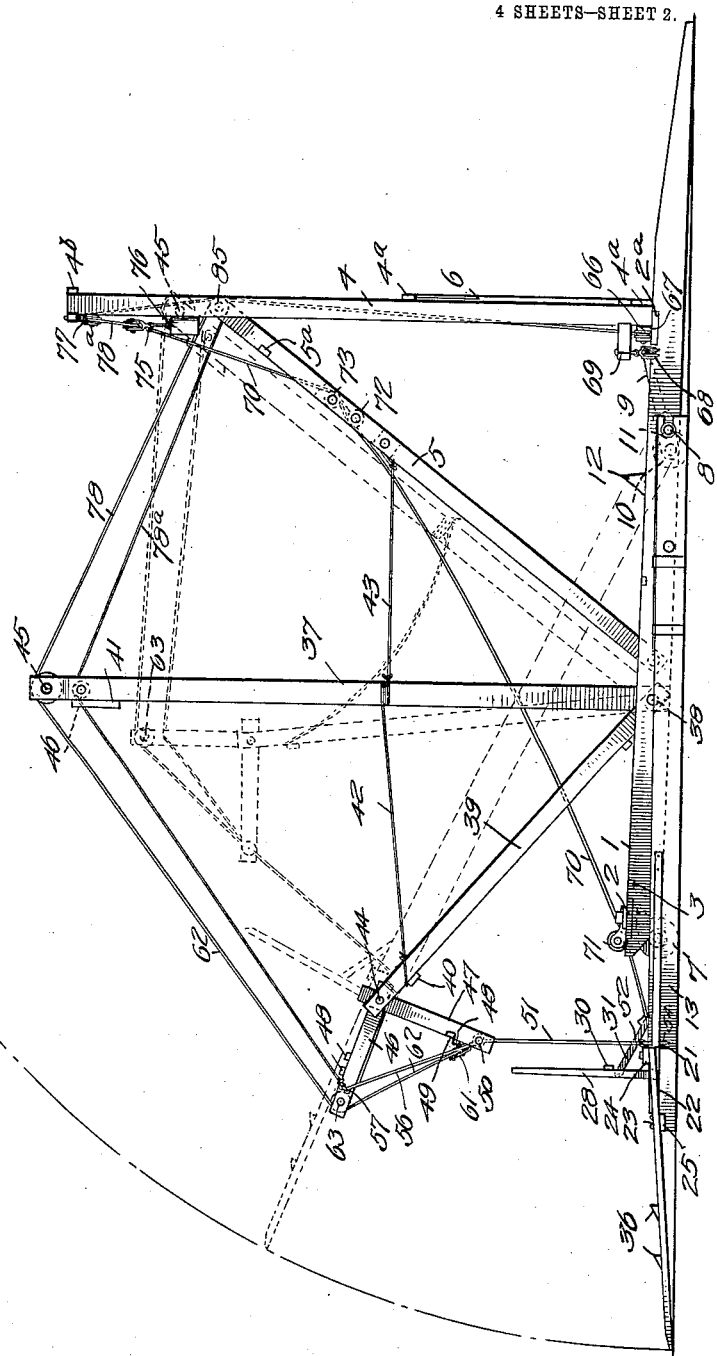

UNITED STATES PATENT OFFICE.

HERBERT A. DANIELS, OF SIMEON, NEBRASKA.

HAY-STACKER.

1,071,511. Specification of Letters Patent. Patented Aug. 26, 1913.

Application filed May 27, 1912. Serial No. 699,904.

*To all whom it may concern:*

Be it known that I, HERBERT A. DANIELS, a citizen of the United States, and a resident of Simeon, in the county of Cherry, State of Nebraska, have invented a new and useful Improvement in Hay-Stackers, of which the following is a specification.

My invention is an improvement in hay stackers, and has for its object the provision of an easily operated device of the character specified, of such simplicity of construction that an ordinary mechanic may build the same, and at a small cost, wherein means is provided for permitting the draft animal to travel in any direction from the stacker while raising the fork, and wherein means is provided for returning the fork to original position and for cushioning the return so that the fork strikes the ground lightly and without jar.

A further object is to provide a fork wherein a considerable movement of the fork is obtained with a relatively small movement of the tackle, and wherein improper loading will not cause the fork to bind as it ascends from unequally distributed weight.

A further object is to provide an improved form of holder for the hay, wherein the angle of the guard fingers may be varied and wherein means is provided for preventing accidental dislodgment of the hay.

A further object is to provide a device having its own means for supporting it for transportation, and wherein the said supporting means may be brought into or out of operative position.

In the drawings: Figure 1 is a perspective view of the improvement, with a part of the fork omitted; Fig. 2 is a side view with the fork in loading position; Fig. 3 is a section on the line 3—3 of Fig. 4, with the fork in dumping position; Fig. 4 is a top plan view; Fig. 5 is an enlarged horizontal section on the line 5—5 of Fig. 1; Fig. 6 is a plan view of a portion of the rocking head; and Fig. 7 is an enlarged sectional view of the fork showing the adjusting mechanism.

The present embodiment of the invention comprises a wheel supported base, a hoisting member or fork, a plurality of tilting members or frames, a rocking head on one of the frames, and the tackle mechanism for lifting the hoisting member or fork. The base is composed of longitudinal bars 1, connected at each end by front and rear cross bars 2 and 2ª and braced by diagonal bars 3. An abutment is arranged at the rear of the base frame, composed of uprights 4, four in number in the present instance, connected by cross bars 4ª at their bottoms and center, and by a pair of cross strips 4ᵇ at their top. Braces 4ᵇ are arranged between the outermost uprights and the central cross bar, and inclined bars 5 are arranged between the central uprights and the respective bars 1. Each bar 5 is bolted at its lower end to the adjacent bar 1, and cross bars 5ª connect the upper ends of the bars 5.

Caster wheels 7 are connected to the cross bar 2, one near each end, and near the cross bar 2ª a shaft 8 is arranged transversely of the base frame in the bars 1. A lever 9 is journaled on the shaft near each end, and the lower end of each lever is forked, as shown in Fig. 1, and a wheel 10 is journaled in the arms 11 of each fork. The levers 9 may take the position of Figs. 1 and 3, or the upper ends of the levers may be swung forwardly into engagement with stops 12 on the bars 1, the said stops being placed to hold the bars in inclined position, with the wheels 10 below and behind shaft 8, to support the rear end of the device out of contact with the ground. That is, with the wheels and levers so arranged the device is wholly supported by the wheels 7 and 10. When so supported, the device may be moved from place to place and may be turned within its own length, while, when the upper ends of the levers are moving rearwardly into the position of Fig. 1, the rear end of the base frame is on the ground, and the device is practically anchored, and the fork may be operated without displacing the frame.

The fork is composed of two longitudinal arms or bars 13, each arranged on the outer side of a bar 1 and pivoted at its rear end on the adjacent end of the shaft 8. A washer 14 is arranged on the shaft outside of each arm, and a cotter pin 15 is passed through the shaft end outside of the washer to hold the arm or bar in place. A lengthening plate 16 is arranged on the inner side of each arm 13 at its rear end, and the said plate is held to the arm by collars 17 encircling the arm and plate, and a bolt 18 passing through the plate and the arm and engaged by a cotter pin 19. The rear ends of the plate and arm are flush and each is slotted longitudinally at 20 to receive the shaft 8. With this arrangement the form arms may be detached from the shaft by merely moving them forwardly. The forward end of each arm 13 is rabbeted on its upper face to form a shoulder 21, and an inclined surface 22, and one of the teeth 23 of the holder for the hay is seated on the said surface with its inner end against the shoulder 21.

The holder for the hay is constituted by a plurality of teeth 23 arranged in parallel spaced relation, and one of the teeth 23 is arranged on the inclined surface 22 of each arm, with the inner end of the teeth abutting against the shoulder 21. A plate 24 is arranged transversely above the teeth at their inner ends, and a second plate 25 is arranged transversely of the teeth beneath the same. Bolts 26 are passed through the plate 24 and the teeth, and the bolts at the arms 13 are also passed through the said arms, securing the plate and teeth to the said arms. Bolts 27 are also passed through plate 25 and the teeth. A guard finger 28 is arranged alongside each tooth, in approximately vertical position, and each of the said fingers is pivoted to the adjacent tooth by a bolt 29. The fingers are connected by a bar 30 secured to their rear faces intermediate their ends, and at each arm 13 a strut 31 is pivoted to the adjacent finger by a bolt 32. The rear end of each strut is provided with a series of ratchet teeth 33, which are adapted to engage the lower leg of a staple 34 connected to the adjacent arm 13, the legs of the staple passing on opposite sides of the strut. When the struts are lifted, to release the teeth from the legs of the staples, the guard fingers may be swung rearwardly or forwardly, to vary the angle or inclination of the said fingers with respect to the teeth. A wedge 35 is provided for holding the teeth of the struts in engagement with the staple leg. The wedge is slipped into the staple between the upper leg and the strut. Each of the teeth has secured to its upper face a plurality of blocks 36, and each block has its rear face perpendicular to the tooth and its front face inclined, Fig. 2. The blocks are arranged in two alined series transversely of the teeth and are designed to prevent the hay from slipping forwardly from off the teeth. The hay is loaded onto the fork by means of sweeps and the blocks assist in holding the hay as the sweep is leaving the fork.

The rear tilting member or A-frame is composed of uprights 37, each being pivoted at its lower end on a shaft 38. The shaft is arranged transversely of the bars 1, and the uprights 39 of the front A-frame or member are also pivoted on the said shaft 38. The upper ends of the uprights of each frame are connected by cross bars 40 and 41, respectively, and a flexible member 42, as, for instance, a rope, connects the adjacent uprights of the frames. A similar flexible member 43 connects each of the uprights 37 to the adjacent inclined bar 5 of the abutment. A shaft 44 is arranged at the upper end of the uprights of the front frame and a shaft 45 is arranged in similar position on the uprights of the rear frame. The cross bar 41 of the rear frame is provided with an opening in which is journaled a pulley 46.

It will be understood that any preferred means may be made use of for bracing the uprights 37 and 39, such bracing being omitted for the sake of clearness, but preferably braces, if used, are arranged at the upper ends of the frames, in order to leave a clear space within the frame for the use of a motor, if desired.

The rocking head is composed of two end frames, each consisting of two bars 46 and 47 arranged in cross relation, and journaled on the shaft 44 at their intersection. The said intersection is nearer one end of each bar than the other, as shown more particularly in Fig. 1, and the corresponding bars of each frame are connected by cross bars 48 and braces 49. A bolt 50 connects the outer ends of the bars 47, and a link 51 connects each arm of the fork with the bolt. Each of the links has an eye 52 at its lower end engaging a ring 53 connected to a loop 54 in the arm. Each link passes inwardly and upwardly, and has an eye 55 at its upper end for engaging the bolt 50. A link 56 connects each end of the bolt with a staple 57 near the outer end of the adjacent bar 46 of the head, and a shaft 63 is arranged at the outer ends of the said bars. The rocking head is substantially triangular, being pivoted to the front swinging frame at one angle, connected to the fork at another angle, the shaft 63 being at the other angle.

A pair of bars 58 extend forwardly between the bars 46 at the last named angle of the head, and pulleys 59 and 60 are journaled on the shaft 63 between the bars. The ends of the bars are rounded and sundry of the said rounded ends are grooved, as shown in Fig. 6, to receive a rope and to permit the rope to slip over the said ends with a minimum of friction. A pulley 61 is connected to the bolt 50, and the hoisting tackle rope 62 is secured to a becket on the pulley. From the pulley the rope passes over the groove 58 on the rocking head, a pulley on the shaft 45 of the rear frame, a pulley on a shaft 85 at the upper ends of the inclined bars 5, thence downwardly under a pulley 66 journaled in a bracket 67 on the base. The rope is then returned to the pulley 61 of the rocking head, passing over pulleys on the shafts 85, 45 and 63, and under pulley 61, and again passes rearwardly over pulleys on shafts 63, 45 and 85 and under a pulley 64 in the bracket 67. From the said pulley the hoisting rope passes outwardly through a pulley 68 on a strut 69 extending laterally from the abutment. The pulley 68 is mounted to swing on the end of the strut, and the end of the rope may be hitched to the draft apparatus. The draft animal may move in any direction from the stacker, since the pulley 68 permits the rope to move smoothly over the pulley in whatever direction the said rope extends. If for any reason the traction is desired to be made from the opposite side of the stacker, the rope is extended across the base frame through the pulley 68, on the opposite strut 69, where traction may again be made in any direction, the pulley being mounted in the same manner as the pulley first mentioned.

The sweep team that brings the hay to the fork may be used to raise or swing the fork if desired for any reason, as the fork is counterbalanced to cushion its return movement. The fork will as a rule return of its own weight, but means is provided for starting it. The said means is a rope 70 having one end connected to the fork and passing over a pulley 71 on the cross bar 2. From the pulley 71 the rope passes over a pulley 72 and under a pulley 73 journaled on parallel axes in a bracket 74 on one of the bars 5 to a connection with a lug 75 on the pulley 77 of a counterweight 76 to be described later. Should the fork be held in lifted position, by wind, for instance, traction on the rope 70 at any point in its length will start it on its return movement. The fork is counterbalanced in its return movement by a pair of counterweights 76, one near each side of the abutment, and each weight is connected to a pulley 77. Each pulley is arranged on a cord or rope 78 and 78ª, respectively, and each cord has one of its ends secured to the upper cross bar of the abutment. Each cord passes inwardly from its attachment, under the adjacent pulley 77 and over a pulley 79 suspended from the said cross bar. Rope 78 is fastened at 4ᵇ, passes downwardly under pulley 77, up over pulley 79, downwardly under pulley 80 at the end of bracket 67, and upwardly to and over a pulley on the end of shaft 85. Then forwardly over shaft 45 and groove 58ª on shaft 63, then downwardly to lug 81 on end of the bolt 50. 78ª fastened at 4ᵇ, passes downwardly under pulley 77, then upwardly over pulley 79, then downwardly under the pulley on end of shaft 85, then forwardly over pulley 46 and fastens at staple 57. The rope 78ª tends to force the fork to the ground until it passes the center, and then it checks the downward movement, and the levers 9 being moved into the position of Fig. 1, a load of hay is placed on the fork. Traction is then made on the hoisting rope 62, and the fork is swung upwardly into the position of Fig. 3, which is the dumping position. If the fork does not return readily, through high wind or other causes, traction is exerted on cord 70.

It will be understood that as soon as the fork is in the position of Fig. 3, the team or animal may be unhitched from the hoisting rope, and the fork permitted to return of itself. If, for instance, when the sweep team has loaded the fork, it is hitched to the hoisting rope, the said team may move away from the stacker in the direction in which it would go for the next load of hay, and as soon as the fork is lifted the team may be released to move ahead to pick up a new load. As the fork starts on its return movement, the weight on rope 78 tends to rock the head toward the abutment, and the weight on rope 78ª acts also in this same manner, but on a different part of the head. The said weights thoroughly cushion the return movement of the fork, so that there is no shock or jar. It will be understood that the weights may be increased or diminished to counterbalance the fork. At the commencement of the return movement of the fork, the weight on rope 78ª acts to swing the rocking head away from the abutment, that is in a manner to start the fork on its return movement. The plates 16 at the inner ends of the forks are for increasing the length of the fork if desired for any reason. To lengthen the fork, the arms 18 are slipped through the bands or collars 17, until the slot 20 of each arm engages the bolt 18. The slot 20 of the plate 16 is now in engagement with the shaft 8.

I claim:

1. A hay stacker comprising a base frame, an abutment at the rear end thereof, a fork pivoted to the base frame near its rear end and extending in front of the said frame, a shaft arranged transversely of the base frame intermediate its ends, a front and a rear swinging frame pivoted to the shaft, a substantially triangular rocking head pivoted at an angle to the top of the front swinging frame, a connection between the fork and the adjacent angle of the frame, hoisting tackle connected to the said last named angle of the head and passing over the other angle of the head and over the upper end of the rear swinging frame to the abutment, said head and swinging frame having pulleys for supporting the tackle, and a counterbalance connected to the fork for cushioning the return thereof.

2. A hay stacker comprising a base frame, an abutment at the rear end thereof, a fork pivoted to the base frame near its rear end and extending in front of the said frame, a shaft arranged transversely of the base frame intermediate its ends, a front and a rear tilting member on the base frame, a rocking head on the front tilting member, a connection between the fork at each side thereof and the rocking head, hoisting tackle connected to the head and passing over the rear tilting member for swinging the fork toward the abutment, means for returning the fork, and a counterbalance connected to the head for cushioning the return movement.

3. A hay stacker comprising a base provided at one end with an abutment, a fork pivoted to the base adjacent to the abutment and extending beyond the opposite end of the base, a plurality of swinging frames on the base, a substantially triangular rocking head pivoted at one angle on the frame remote from the abutment, a connection between another angle of the frame and the fork, hoisting tackle connected to the last named angle and passing over the third angle and the rear swinging frame for swinging the fork toward the abutment, means for returning the fork, and a counterbalance for cushioning the return movement.

4. A hay stacker comprising a base provided at one end with an abutment, a fork pivoted to the base adjacent to the abutment and extending beyond the opposite end of the base, a plurality of swinging frames on the base, a rocking head on the frame remote from the abutment, a connection between the head and the fork, hoisting tackle connected to the head and passing over the other frame for swinging the fork toward the abutment, means for returning the fork, and means for cushioning the return movement.

5. A hay stacker comprising a base provided at one end with an abutment, a fork pivoted to the base adjacent to the abutment and extending beyond the opposite end of the base, a plurality of swinging frames on the base, a rocking head on the frame remote from the abutment, a connection between the head and the fork, hoisting tackle connected to the head and passing over the other frame for swinging the fork toward the abutment, and means for cushioning the return movement of the fork.

6. A hay stacker comprising a base provided at one end with an abutment, a fork pivoted to the base adjacent to the abutment, a plurality of swinging frames on the base, a rocking head on the frame remote from the abutment, a connection between the head and the fork, hoisting tackle connected with the head and passing over the other frame for swinging the fork toward the abutment, and means for returning the fork.

HERBERT A. DANIELS.

Witnesses:
C. E. TRAINOR,
SOLON C. KEMON.

Copies of this patent may be obtained for five cents each, by addressing the "Commissioner of Patents, Washington, D. C."